United States Patent [19]
Van Nguyen et al.

[11] Patent Number: 6,012,104
[45] Date of Patent: Jan. 4, 2000

[54] METHOD AND APPARATUS FOR DYNAMIC EXTENSION OF CHANNEL PROGRAMS

[75] Inventors: Tu Van Nguyen, Apex; Jerry Wayne Stevens, Raleigh, both of N.C.

[73] Assignee: International Business Machines Corporation, Armonk, N.Y.

[21] Appl. No.: 08/957,044

[22] Filed: Oct. 24, 1997

[51] Int. Cl.$^7$ .................................................... G06F 9/00
[52] U.S. Cl. .................................... 710/8; 710/38; 710/5; 710/6; 395/500.48
[58] Field of Search ............................... 710/38, 6, 5, 52, 710/53, 57; 709/226, 227, 228, 229, 238, 239; 395/500.48

[56] References Cited

U.S. PATENT DOCUMENTS 5,367,661  11/1994  Hough et al. .
5,584,039  12/1996  Johnson et al. .............................. 710/6

OTHER PUBLICATIONS

IBM Technical Disclosure, vol. 35, No. 5, Efficient ESA/370 Read Channel Programming, pp. 107–115, Oct. 1992.
IBM Technical Disclosure Bulletin, vol. 29, No. 1 Jun., 1986, pp. 273–275, "Interrupt–Free Interprocessor Communications", SPI Database of Software Technologies.
IBM Technical Disclosure Bulletin, Aug. 1976, pp. 849–852, "Processor to Processor Communications Mechanism", SPI Database of Software Technologies.
Efficient ESA/370 Read Channel Programming, IBM Technical Disclosure Bulletin, No. 5, Oct., 1992, pp. 107–115.

*Primary Examiner*—Glenn A. Auve
*Assistant Examiner*—Rupal D. Dharia
*Attorney, Agent, or Firm*—Jeanine S. Ray-Yarletts

[57] ABSTRACT

The present invention provides a method, system, and computer program product for extending channel programs in a computer system which uses a channel sub-system. An initial channel program is built to end with a terminating channel command word (CCW) followed by a dummy CCW. When required, a new channel program is built separately, then the dummy CCW in the initial channel program is modified to transfer channel execution to the new channel program. Once modification of the dummy CCW is completed, the terminating CCW in the initial channel program is modified to allow the newly-built transfer CCW to execute.

9 Claims, 5 Drawing Sheets

250 GENERIC CCW FORMAT

251 NOP CCW FORMAT

252 TIC CCW FORMAT

METHOD AND APPARATUS FOR DYNAMIC EXTENSION OF CHANNEL PROGRAMS

FIELD OF THE INVENTION

The present invention relates to a technique, specifically apparatus and accompanying method, for use in an operating system for updating a dynamically alterable channel program that controls an input/output (I/O) device, so as to eliminate errors caused when the I/O device attempts to read the channel program as it is being modified by the operating system, thereby increasing channel throughput and reducing performance degradation in the operating system due to interrupts.

BACKGROUND OF THE INVENTION

Generally speaking, modern computers, particularly mainframe systems, are formed of a main storage, one or more central processing units (CPUs), operator facilities, a channel sub-system which includes an input/output processor (IOP) and various input/output (I/O) devices. The I/O devices are typified by direct access storage devices, tape drives, keyboards, printers, displays, and communications controllers and adapters.

Of particular relevance here, the channel sub-system controls and directs the flow of information between the main storage and typically each I/O device. Such a sub-system relieves each CPU in the computer system of a need to communicate directly with each I/O device, thereby permitting data processing to proceed concurrently with I/O processing. This increases the throughput of the entire computer.

The channel sub-system uses one or more so-called channel paths as a communications link to transfer and manage the flow of information to and from the I/O devices. As part of I/O processing, the channel sub-system tests for available channel paths, selecting an available path to employ in connection with a particular I/O device then to be used, and initiates the execution of an I/O operation over that path and through the device. The channel sub-system contains sub-channels, each of which is associated with one or more channel paths. One sub-channel is typically provided for and dedicated to each I/O device that is accessible through the channel sub-system. Each sub-channel stores information concerning the associated I/O device and its particular attachment to the channel sub-system. Each sub-channel also stores information concerning I/O operations and other functions involving its associated I/O device. Any of the information can be accessed either by the CPU(s) in the computer system through the use of I/O instructions or by the channel sub-system itself and serves to provide communication, with respect to the associated I/O device, between any such CPU and the channel sub-system. The actual number of channels that is provided in any computer system can vary widely and is based on the configuration of that system, i.e., the specific architecture of the system without regard to the I/O devices.

Each I/O device is attached, through an associated control unit, to the channel sub-system via a channel path. Each such control unit may be attached to more than one channel path; an I/O device may be attached to more than one control unit. As such, a particular I/O device may be accessible to the channel sub-system over a number of different channel paths, with this number based on the configuration of the overall computer. For additional information on the channel sub-system and its functions, the reader is illustratively referred to Chapter 2, "Organization" of *Enterprise Architecture/390: Principles of Operation*, Publication Number SA22-7201-04, Fifth Edition, June 1997, (copyright 1997 International Business Machines Corporation), which, for simplicity will be hereinafter referred to as the "ESA/390 Manual."

To use a channel, a CPU issues a so-called channel program, which consists of channel command words (CCW), for subsequent execution by the channel subsystem. For any sub-channel, each CCW specifies a command to be executed by the IOP over that sub-channel. For commands that initiate certain I/O operations, each of the associated CCWs designates an area in main storage that is to be utilized with each of these operations and an action that will be taken whenever a transfer to or from that area is completed, as well as other options. A channel program consists of one or more CCWs that are logically linked such that all of these CCWs are fetched by the channel subsystem and executed in the specific sequence specified by a CPU program.

Contiguous CCWs are linked by the use of chain-data or chain-command flags, and non-contiguous CCWs may be linked by a CCW specifying a "transfer-in-channel" (TIC) command. A CCW becomes current when: (a) it is the first CCW of a channel program and has been fetched, (b) during command chaining, that CCW is logically fetched, or (c) during data chaining, that CCW takes over control of an I/O operation. Many I/O devices expect channel programs to end with a certain CCW or sequence of CCWs. The most common ending for a channel program is a no-operation (NOP) CCW whose command chaining flag is off, indicating that it is the last CCW. If a NOP CCW's command chaining flag is on, channel program execution continues with the next contiguous CCW in memory.

During CPU program execution on certain computer systems, such as those that employ ESA/370 or series 9000 architecture, channel programs may be dynamically extended by a CPU in order to undertake additional I/O operations, as required by the CPU program. This advantageously permits further information to be transferred between main storage and an I/O device then in use without a need to restart the sub-channel each time. In that regard, the CPU program will illustratively build an "initial" channel program, i.e., containing an initial CCW, to transfer an initial record from main storage onto a network adapter known as Common Link Access to Workstation (CLAW). Once this particular operation is underway and the CPU program has executed further, the CPU program may require more records to be transferred to or from the CLAW adapter. To send subsequent records, the CPU will likely append, through a well-known technique called "command chaining," one or more additional CCWs to the channel program in order to transfer the second record, and so forth for each successive record. This enables the sending of the records without the necessity of the CPU, specifically an I/O supervisor within the operating system, having to repetitively issue a separate start sub-channel (SSCH) command for each of these records and re-establish the associated channel path, thereby saving channel execution time and providing increased channel throughput.

Hence, through command chaining, the last CCW in a channel program executing at the time will be modified to point to the next successive CCW, and so forth in order to chain all the successive CCWs together into a single channel program for the associated I/O device. Furthermore, as part of the process that modifies the channel program and to conserve storage, the CPU may also release locations in the main storage associated with newly used and now obsolete segments of this channel program.

Command chaining is particularly effective when the CPU can outrun the I/O Processor (IOP). When the IOP completes a channel program, it issues an interrupt to the CPU program, causing overhead to the CPU program and requiring that the IOP be restarted to perform a subsequent I/O operation. If the CPU can continuously extend an executing channel program such that the IOP seldom or never reaches the end of a channel program, interrupts and restarts are greatly reduced.

The CPU and the IOP operate independently of each other with no synchronization between themselves, except for interrupts that the IOP may issue to the CPU. This can cause problems when a CPU attempts to extend running channel program. FIGS. 1A and 1B depict a simple illustration of a channel program to be extended. Initially, the channel program resides in Buffer A 100, and consists of a Write CCW 101 chained to a TIC CCW 103 which points to a NOP CCW 104. A NOP CCW which is not chained to another command ends a channel program. As this channel program is executing, the CPU builds additional CCWs in Buffer B 115. This new channel program is built similarly to the one in Buffer A, and when it is built, the CPU will modify the TIC 103 in Buffer A 100 to point to the beginning of the additional CCWs 109. Three results can occur from this operation. If the CPU does not complete this process before the IOP fetches the TIC of the initial channel program 103, the IOP will fetch the terminating NOP CCW 104 and end its operation, causing it to issue an interrupt to the CPU, and the CPU will have to restart the IOP to cause the CCWs in Buffer B to be executed. However, if the CPU makes the change in the TIC 103 before the IOP reaches that point, the channel program will fetch the first CCW of the additional CCWs 109 and continue executing the new instructions without interruption, which is the desired result.

The third, undesirable result is that the IOP is reading the TIC CCW at the same time that the CPU is modifying its address field 261 to point to the additional CCWs. This may result in the IOP reading an invalid address out of the TIC, as the word containing the address is in an indeterminate state while it is being updated by the CPU. It may contain the old address, the new address, or, most undesirably, some random combination of bytes from each address. This random combination result would cause the IOP to attempt to execute random storage, which may not contain CCWs, causing the IOP to program-check, resulting in an undesirable interruption of the CPU and termination of the I/O processing. While this result may seem rare, in today's high-performance computer systems in which thousands of I/O operations may be performed per second, it can happen unacceptably often.

A second prior art method of extending channel programs which attempts to reduce the window of error is illustrated in FIGS. 2A and 2B. In this example, the CPU builds an initial channel program in Buffer A 200 ending with two NOP CCWs, with the first NOP CCW 206 command chained to the second one 207. When the channel program needs to be extended, the CPU writes the additional CCWs into Buffer B 202. The additional CCWs end with a structure (215,216) similar to the initial channel program (206,207), so that they may be extended in a similar manner if necessary. After the additional CCWs are completed, the CPU modifies the second NOP CCW in the original channel program in Buffer A to change it into a TIC CCW 208, which transfers control to the first of the subsequent CCWs 213.

This second method improves on the first method in two ways. First, this second method reduces the probability that the IOP will complete processing before the CPU can update the CCW to cause command chaining to occur, as the final CCW is being updated instead of the penultimate one as is done in the first method.

Second, the window in which the IOP may read an invalid CCW is reduced. FIG. 2C shows illustrative CCW formats. A generic CCW format 250, is shown with the format of a NOP 251 and a TIC 252 CCW. For these formats, if the process of converting the NOP CCW into a TIC CCW is performed in two steps, the invalid address window is eliminated and replaced with a smaller invalid CCW window. First the CPU replaces the empty address field 258 in the NOP CCW with the address 261 of the beginning of the additional CCWs. Since the command code 253 has not yet been changed from NOP to TIC, this address will be ignored by the IOP if the IOP reaches this CCW while the CPU is modifying the address. After the address modification is complete, the CPU modifies the flags field 254 to the values 260 appropriate for the TIC CCW being built. Finally, the CPU modifies the command code 253 to indicate that the CCW is a TIC 259. There still exists a window in which the IOP may read the CCW with invalid contents if the IOP reads the CCW as the CPU is updating these fields. If the command code has not yet been changed from NOP to TIC, then invalid contents in the flags field will not cause a problem, as this field is ignored. If the command code is in the process of being modified, the IOP may read an invalid command code and program-check. However, as the command code field contains fewer bytes than the address field, this window is smaller than the window in which the address may be updated using the first method, so the probability of error, while still existent, is smaller. On machines that employ IBM's ES/9000 or 390 architecture, the address field would contain four bytes and the command code field would contain one byte, so the invalid CCW window is reduced to one-fourth its former size. However, this probability for error is still unacceptably high, as is the probability that the IOP will complete processing before the channel program is extended, causing undesirable interrupts.

OBJECT OF THE INVENTION

It is the object of the present invention to provide a method for extending channel programs which improves upon the efficiency of the prior art, thereby minimizing the probability that an invalid CCW will be read by the IOP, as well as reducing interruptions of the CPU by the IOP.

SUMMARY OF THE INVENTION

The present invention provides a method, system, and program product for extending channel programs to minimize windows for error and interruptions of the CPU by the IOP.

Using the method of the present invention, channel programs are built by the CPU to include terminating CCWs that ease their extension.

The structure of the terminating CCWs comprises a penultimate CCW that causes the channel program execution to terminate, followed by a final, dummy CCW that will later be modified to cause the channel program execution to transfer control to a subsequent channel program. Initially, this final CCW does not contain an address to which execution is to be transferred, because the subsequent channel program is not yet built. However, since the penultimate CCW causes the channel program to terminate, this final CCW will not be executed.

When an initial channel program is to be extended, the CPU first builds the subsequent channel program with a similar ending structure to the initial channel program to permit the subsequent channel program to also be easily extended. Then the CPU modifies the terminating CCWs of the initial channel program to cause channel execution to continue into the subsequent channel program, using the following modification sequence: First the CPU modifies the final CCW of the initial channel program to cause channel program execution to transfer to the subsequent channel program. After the modification of the final CCW is completed and there is no possibility that the IOP may read the final CCW in an intermediate state, the CPU modifies the penultimate CCW to allow execution to continue from it into the final CCW. This modification requires only the change of one data bit, so the likelihood that the IOP will read the penultimate CCW in an intermediate state while it is being changed by the CPU is eliminated.

BRIEF DESCRIPTION OF THE DRAWINGS

The preferred embodiment of the present invention will be herein described in more detail with reference to the drawings, in which.

DETAILED DESCRIPTION OF THE PREFERRED EMBODIMENT

The preferred embodiment of the present invention will be herein described with reference to the ESA/390 or ES/9000 type of computer that is manufactured by International Business Machines (IBM) corporation, which is also the present assignee hereof. The present invention is not limited to the ESA/390 or ES/9000 computer architecture, and is applicable to any computer system which utilizes a channel sub-system to control I/O.

Figure 1A:
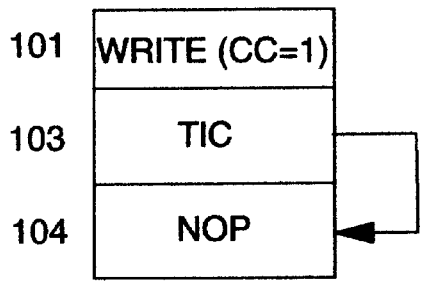
FIG. 1A depicts a prior art channel program before it is extended.
Figure 1B:
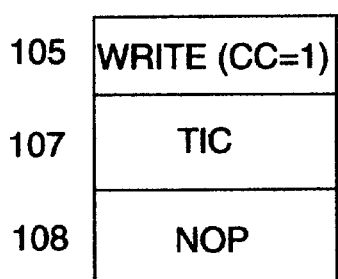
FIG. 1B depicts the prior art channel program of FIG. 1A after it is extended into a subsequent channel program using a prior art method.
Figure 1B:
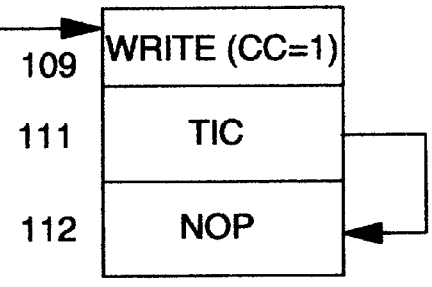
Figure 2A:
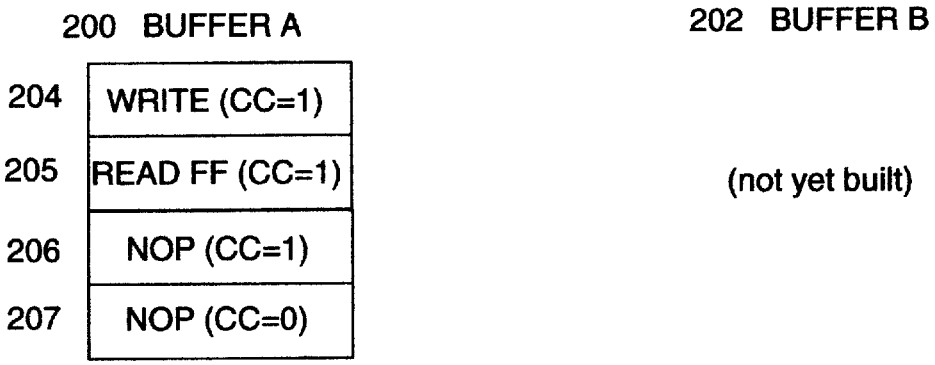
FIG. 2A depicts a prior art channel program before it is extended.
Figure 2B:
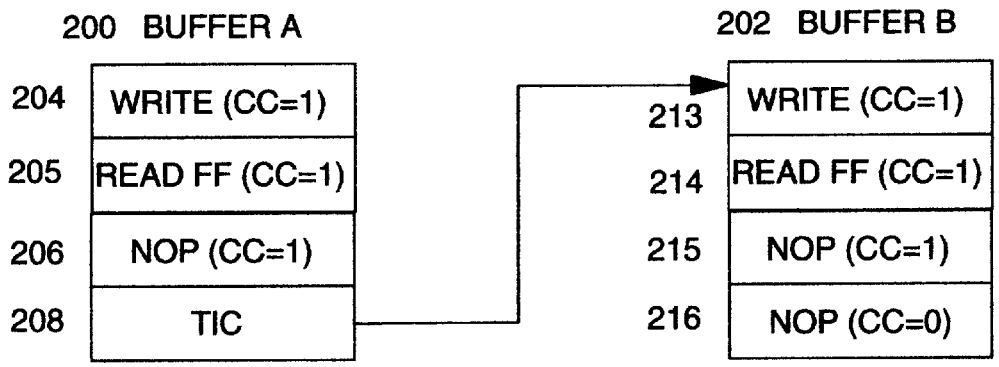
FIG. 2B depicts the prior art channel program of FIG. 2A after it is extended into a subsequent channel program using an improved prior art method.
Figure 2C:
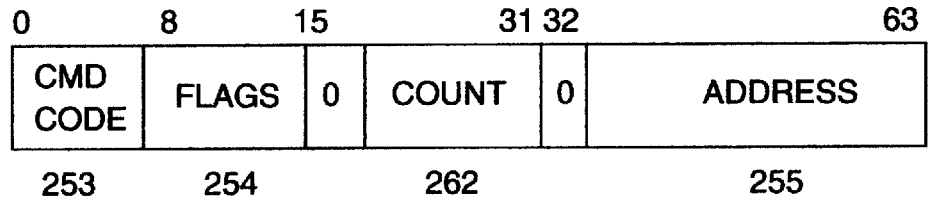
FIG. 2C depicts illustrative CCW formats.
Figure 2C:
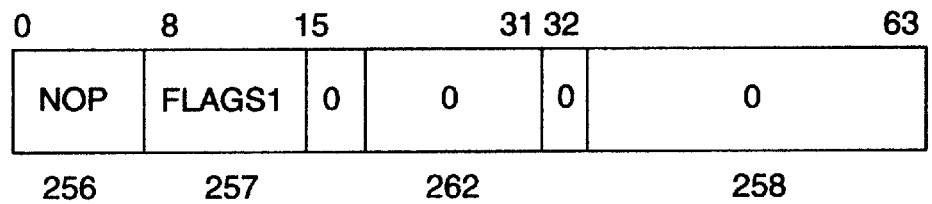
Figure 2C:
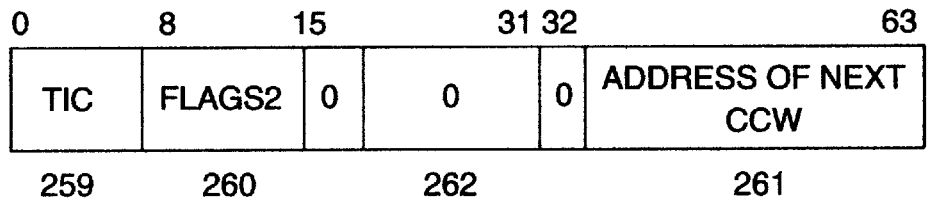
Figure 3:
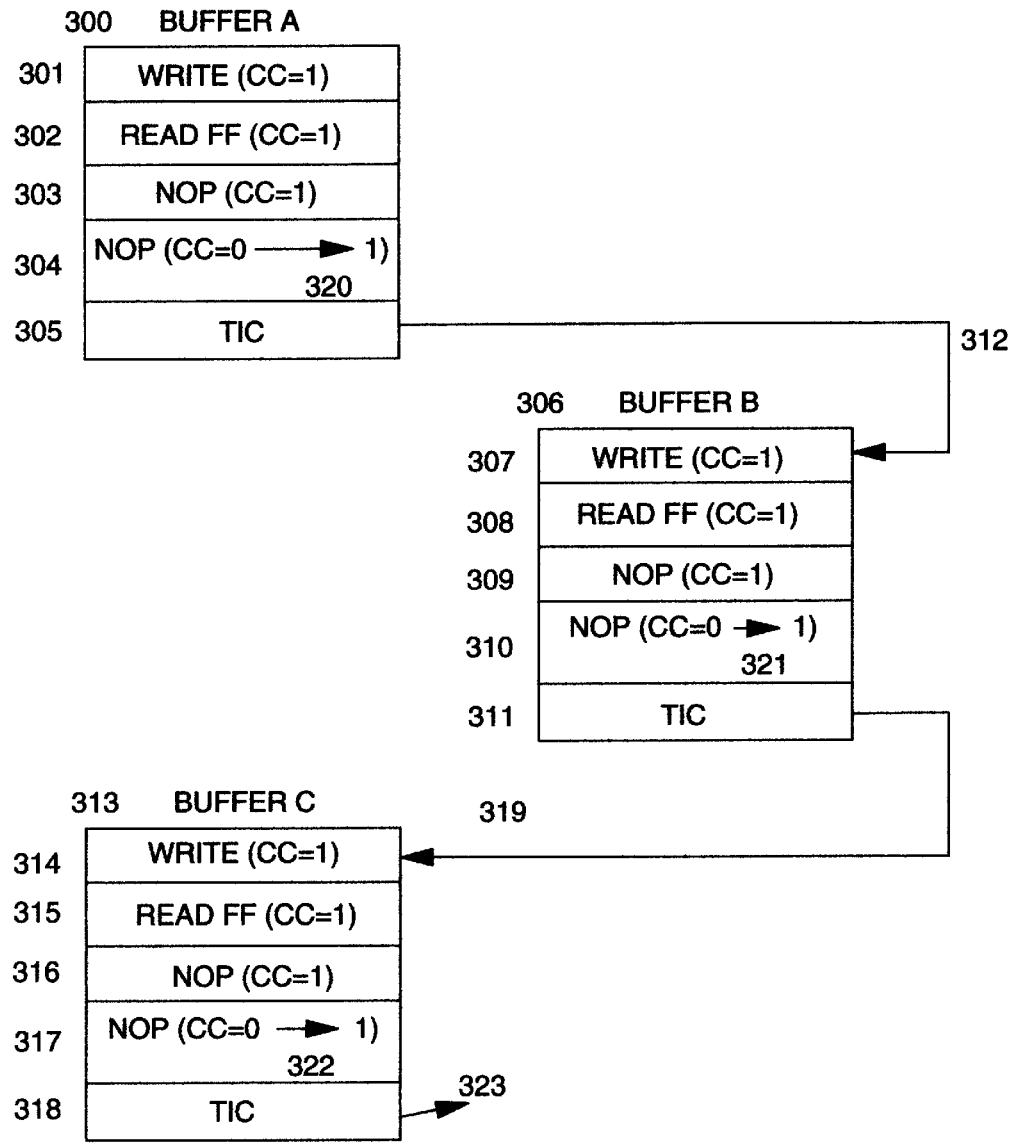
FIG. 3 depicts the improved method of extending channel programs of the present invention.

FIG. 3 depicts the extension of a channel program using the method of the present invention. An illustrative initial channel program to write data to an I/O device is built by the CPU in Buffer A 300. This initial channel program consists of normal channel command words (CCWs) to control an I/O processor (IOP) to cause data to be written from computer memory to an I/O device. This channel program is terminated with two CCWs: a penultimate NOP CCW 304 whose command chaining flag is zero (off), and a TIC CCW 305. Because the command chaining flag of the NOP CCW is zero, the NOP CCW is said to be not command chained, and the channel program will terminate upon executing it, so the contents of the TIC CCW are immaterial in this initial state. Illustrative CCW formats are shown in FIG. 2B. In this preferred embodiment, the TIC CCW 252 is completely built except for the branch address 261, as no branch address is yet known. However, the teachings of the present invention do not preclude initially building the final CCW 305 in any type of format or lack thereof, so long as the storage for it exists following the NOP CCW 304.

After the CPU builds this channel program 300, it will issue a start sub-channel command to the channel subsystem and continue executing other instructions and processes. Independently of the CPU, the IOP of the channel subsystem will begin execution of the channel program. If the IOP reaches the NOP instruction 304 before the channel program is extended, the channel program will terminate and issue an interrupt to the CPU and the CPU will be required to issue another start channel command to cause any subsequent CCWs to be executed.

Once the channel program execution is underway, the CPU may require more data to be handled by the channel subsystem. To accomplish this, the CPU will build additional CCWs in another buffer, in this case Buffer B 306. When this second buffer of CCWs is built, the CPU may determine if the original channel program is still running. If the CPU has received an interrupt from the IOP indicating that the channel program has completed, then the CPU will be required to restart the IOP with another start sub-channel command to execute the CCWs in Buffer B. If no such interrupt has been received, then the CPU may extend the initial channel program using the method of the present invention, to include the CCWs in Buffer B. This extension would advantageously permit the IOP to continue execution into the CCWs built in Buffer B without interrupting the CPU and requiring a new start sub-channel command.

To extend the initial channel program 300 using the method of the present invention, the CPU modifies the address field 261 of the final TIC CCW 305 to include the address 312 of the first CCW 307 in Buffer B 306. Because the NOP CCW 304 of this channel program is not command chained, there is no possibility that the IOP will read the address from the final TIC CCW while it is being modified by the CPU, eliminating any possibility that the IOP will read an invalid address. Because of this terminating feature of the NOP CCW 304, any changes which are necessary to build a valid TIC CCW that points to the first CCW of the new channel program may be made without introducing windows in which the IOP may read an invalid, incomplete or inconsistent CCW.

Once the modification of the final CCW 305 of the initial channel program 300 is completed, the NOP CCW 304 of that channel program is modified to allow the final CCW to execute. This change is made by altering its command chaining flag 320 from zero to one. As this flag comprises a single bit, there is no intermediate window in which it is partially modified, in which the IOP may read an invalid or inconsistent CCW. If the change to this command chaining flag 320 is performed before the IOP fetches the NOP CCW, then the IOP will continue executing the channel program by fetching and executing the TIC CCW 305, which will cause it to execute the channel program in Buffer B 306. If the change to this command chaining flag is performed after the IOP fetches the NOP CCW, then the IOP will terminate the channel program execution and issue an interrupt to the CPU, which will cause the CPU to issue a new start sub-channel command to cause the IOP to begin executing the channel program in Buffer B 306. There is no window during which the IOP could fetch an inconsistent, incomplete, or invalid CCW.

As long as each channel program and channel program extension is initially built by the CPU according to the method of the present invention, the running channel program can be indefinitely extended if the CPU's processing can stay ahead of the IOP's processing. For example, after extending the running channel program to include the CCWs in Buffer B 306, the CPU could build additional CCWs in Buffer C 313 and perform the method of the present invention to modify the final CCW 311 of Buffer B to point 319 to the first CCW 314 of Buffer B and then modify the NOP CCW 310 of Buffer B to allow Buffer B's TIC CCW 311 to execute and so on indefinitely.

Figure 4:
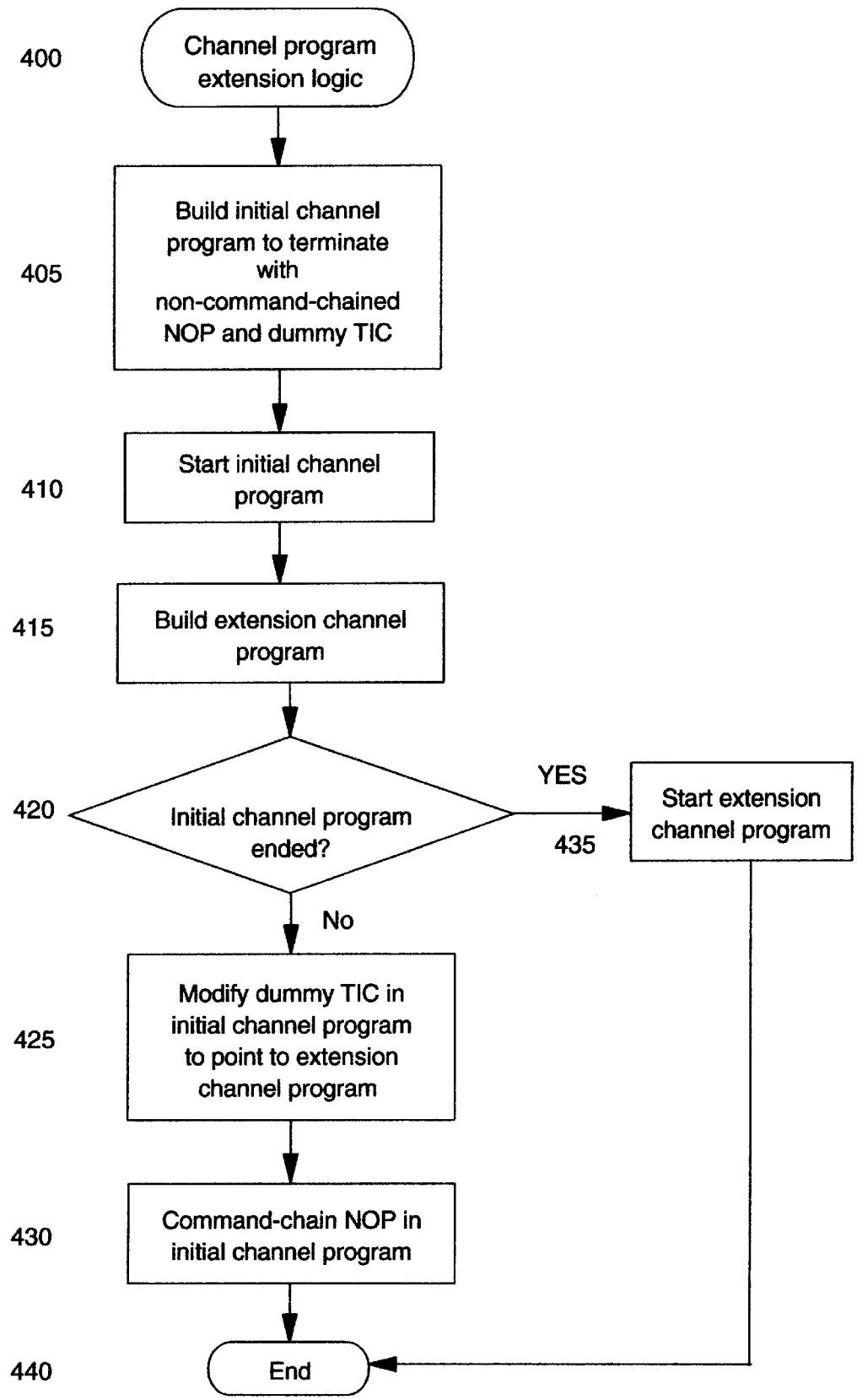
FIG. 4 depicts the logic of the improved method of extending channel programs of the present invention.

The method of the preferred embodiment of the present invention is visually depicted in FIG. 4. An initial channel program is built 405 with a terminating sequence that consists of a non-command chained NOP CCW followed by a final, dummy TIC CCW, so-called because as it is initially built the TIC CCW will not be effective and is merely reserving storage for a TIC CCW that may be built. After the initial channel program is started 410 and the CPU realizes it requires more channel operations for the device, the extension channel program is built 415 in a similar manner. Once the extension channel program is built, the CPU determines if the initial channel program has completed 420. If not, then the CPU modifies the final TIC in the initial channel program to point to the beginning of the extension channel program 425. Once this modification is completed, the CPU will modify the command chaining flag in the terminating NOP CCW 430 so that the newly built TIC CCW may be executed. This completes the extension of the channel program. If the initial channel program has completed, then the extension channel program must be started by the CPU 435.

What is claimed is:

1. A method of extending an initial channel program in a computer system, said method comprising the steps of:
   - generating said initial channel program wherein said initial channel program comprises successive channel command words, said successive channel command words comprising at least:
     - a final channel command word and,
     - a penultimate channel command word to terminate said initial channel program;
   - generating a successive channel program;
   - modifying said final channel command word in said initial channel program such that said final channel command word causes channel control to transfer to said successive channel program, and;
   - modifying said penultimate channel command word in said initial channel program to permit said final channel command word in said initial channel program to be executed;
   - wherein said penultimate channel command word in said initial channel program is initially a no-operation command with the command chaining flag in the "off" state and is modified to permit said last channel command word in said initial channel program to be executed by causing the command chaining flag in said penultimate channel command word to be placed in the "on" state.

2. A method as claimed in claim 1, wherein said final channel command word in said initial channel program is a transfer-in-channel command.

3. A method as claimed in claim 1, wherein said generating steps and said modifying steps are iteratively performed.

4. A computer program product for extending an initial channel program in a computer system, said computer program product comprising:
   - a computer-readable storage medium having computer-readable program code means embodied in said medium, said computer-readable program code means comprising:
     - computer-readable program code means for generating said initial channel program wherein said initial channel program comprises successive channel command words, said successive channel command words comprising at least:
       - a final channel command word and,
       - a penultimate channel command word to terminate said initial channel program;
     - computer-readable program code means for generating a successive channel program;
     - computer-readable program code means for modifying said final channel command word in said initial channel program such that said final channel command word causes channel control to transfer to said successive channel program, and;
     - computer-readable program code means for modifying said penultimate channel command word in said initial channel program to permit said final channel command word in said initial channel program to be executed; wherein said penultimate channel command word in said initial channel program is initially a no-operation command with the command chaining flag in the "off" state and is modified to permit said last channel command word in said initial channel program to be executed by causing the command chaining flag in said penultimate channel command word to be placed in the "on" state.

5. A computer program product as claimed in claim 4, wherein said final channel command word in said initial channel program is a transfer-in-channel command.

6. A computer program product as claimed in claim 4, wherein said generating steps and said modifying steps are iteratively performed.

7. A system for extending an initial channel program in a computer system, said system comprising:
   - means for generating said initial channel program wherein said initial channel program comprises successive channel command words, said successive channel command words comprising at least:
     - a final channel command word and,
     - a penultimate channel command word to terminate said initial channel program;
   - means for generating a successive channel program;
   - means for modifying said final channel command word in said initial channel program such that said final channel command word causes channel control to transfer to said successive channel program, and;
   - means for modifying said penultimate channel command word in said initial channel program to permit said final channel command word in said initial channel program to be executed; wherein said penultimate channel command word in said initial channel program is initially a no-operation command with the command chaining flag in the "off" state and is modified to permit said last channel command word in said initial channel program to be executed by causing the command chaining flag in said penultimate channel command word to be placed in the "on" state.

8. A system as claimed in claim 7, wherein said final channel command word in said initial channel program is a transfer-in-channel command.

9. A system as claimed in claim 7, wherein said generating steps and said modifying steps are iteratively performed.

* * * * *